United States Patent
Bill

(10) Patent No.: US 9,300,567 B2
(45) Date of Patent: Mar. 29, 2016

(54) SYSTEMS AND METHODS FOR ADJUSTING A WIRELESS NETWORK BASED ON TRANSACTION DATA

(71) Applicant: AOL Inc., Dulles, VA (US)

(72) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 128 days.

(21) Appl. No.: 14/068,723

(22) Filed: Oct. 31, 2013

(65) Prior Publication Data

US 2014/0056179 A1    Feb. 27, 2014

Related U.S. Application Data

(63) Continuation of application No. 11/463,371, filed on Aug. 9, 2006, now Pat. No. 8,595,348.

(51) Int. Cl.

| | |
|---|---|
| *H04L 12/24* | (2006.01) |
| *H04L 12/733* | (2013.01) |
| *H04L 12/721* | (2013.01) |
| *H04W 40/24* | (2009.01) |
| *H04L 12/26* | (2006.01) |

(52) U.S. Cl.
CPC ............ *H04L 45/122* (2013.01); *H04L 41/046* (2013.01); *H04L 41/085* (2013.01); *H04L 41/12* (2013.01); *H04L 45/36* (2013.01); *H04W 40/24* (2013.01); *H04L 12/2602* (2013.01); *H04L 43/00* (2013.01); *H04L 43/0876* (2013.01); *H04L 45/20* (2013.01)

(58) Field of Classification Search
CPC ..... H04L 41/085; H04L 45/122; H04L 45/20; H04L 41/12; H04L 43/00
See application file for complete search history.

(56) References Cited

U.S. PATENT DOCUMENTS

| | | | |
|---|---|---|---|
| 6,865,609 B1 | 3/2005 | Gubbi et al. | |
| 7,849,408 B1 * | 12/2010 | Messinger et al. | 715/736 |
| 2002/0013856 A1 | 1/2002 | Garcia-Luna-Aceves et al. | |
| 2002/0161476 A1 | 10/2002 | Panofsky et al. | |
| 2003/0187749 A1 | 10/2003 | Peled et al. | |
| 2003/0217139 A1 | 11/2003 | Burbeck et al. | |
| 2004/0210654 A1 | 10/2004 | Hrastar | |
| 2005/0129005 A1 * | 6/2005 | Srikrishna et al. | 370/356 |
| 2005/0138139 A1 | 6/2005 | Jain et al. | |
| 2006/0015399 A1 | 1/2006 | Alberth et al. | |
| 2006/0230134 A1 * | 10/2006 | Qian et al. | 709/224 |
| 2009/0052366 A1 * | 2/2009 | Doi et al. | 370/315 |

* cited by examiner

*Primary Examiner* — Patrice Winder
*Assistant Examiner* — Nam Tran
(74) *Attorney, Agent, or Firm* — Finnegan, Henderson, Farabow, Garrett & Dunner LLP

(57) ABSTRACT

A distribution of a content selection being distributed throughout a wireless mesh network may be tracked. A wireless device in the wireless mesh network enables the content selection to be exchanged. Wireless devices then exchange the content, and a network topology is recorded in response. Finally, the network topology is reported to a reporting agent.

22 Claims, 6 Drawing Sheets

SYSTEMS AND METHODS FOR ADJUSTING A WIRELESS NETWORK BASED ON TRANSACTION DATA

CROSS-REFERENCE TO RELATED APPLICATION

This application is a continuation of U.S. patent application Ser. No. 11/463,371, filed Aug. 9, 2006, the entire disclosure of which is expressly incorporated herein by reference.

TECHNICAL FIELD

This document relates to distribution of content in a network.

BACKGROUND

Wireless mesh networks allow users to form dynamic networks using neighboring devices, among other things, to extend the reach of a wireless network. For example, a wireless laptop may use a neighboring wireless laptop as a "leap pad" and access a wireless access point acting as an Internet gateway.

SUMMARY

In one general sense, distribution of a content selection throughout a wireless mesh network may be tracked by enabling a wireless device in the wireless mesh network to exchange the content selection, exchanging the content selection, recording a network topology for the wireless mesh network in response to exchanging the content selection, and reporting the network topology to a reporting agent.

Implementations may include one or more of the following features. For example, at least one other topology besides the wireless network topology may be received. A model of a distribution pattern may be generated. Placement instruction with placement objectives may be received and a distribution plan may be generated for distributing the content selection in the wireless mesh network based on the model and the placement objectives.

Receiving the placement instruction with the placement objectives may include generating a distribution plan with a larger circulation using a reduced number of wireless devices initially receiving the content selection directly from a content provider. Recording the network topology may include recording path information related to a distribution path used to exchange the content selection between a providing device and a receiving device.

Recording the network topology may include recording bandwidth utilization across one or more links in the wireless network as the content selection is exchange, or recording a description of which applications are being used across one or more links in the wireless network as the content selection is exchanged.

Recording the network topology may include recording identification information for other devices in the wireless mesh network as the content selection is exchanged. Recording the identification information for the other devices may include recording a description of at least one user on the other devices. Recording the network topology may include recording a routing table for the wireless mesh network. Exchanging the content selection may include streaming the content selection from a first wireless device to a second wireless device such that the second wireless device only stores a portion of the content selection.

It may be determined that at least one other device should distribute the content selection. A staging device to distribute the content selection may be identified and the content selection may be loaded from an originating device to available storage on the staging device. The staging device may be instructed to enable access by additional devices to the content selection.

Identifying the staging device may include identifying a wireless device associated with a user authorizing the wireless device to act in a promotional configuration. A broadcast message with an indication of which content selections are available on a first device may be transmitted. A broadcast message with an indication of user preferences for a first device may be transmitted. A broadcast message with an indication of which content selections are available in the wireless mesh network or an indication of user preferences in the wireless mesh network may be transmitted.

A request for a particular selection or a content selection responsive to a particular interest may be transmitted. The wireless device may include a wireless-enabled portable media device. Exchanging the content selection may include exchanging an audio selection.

DETAILED DESCRIPTION

Figure 1A:
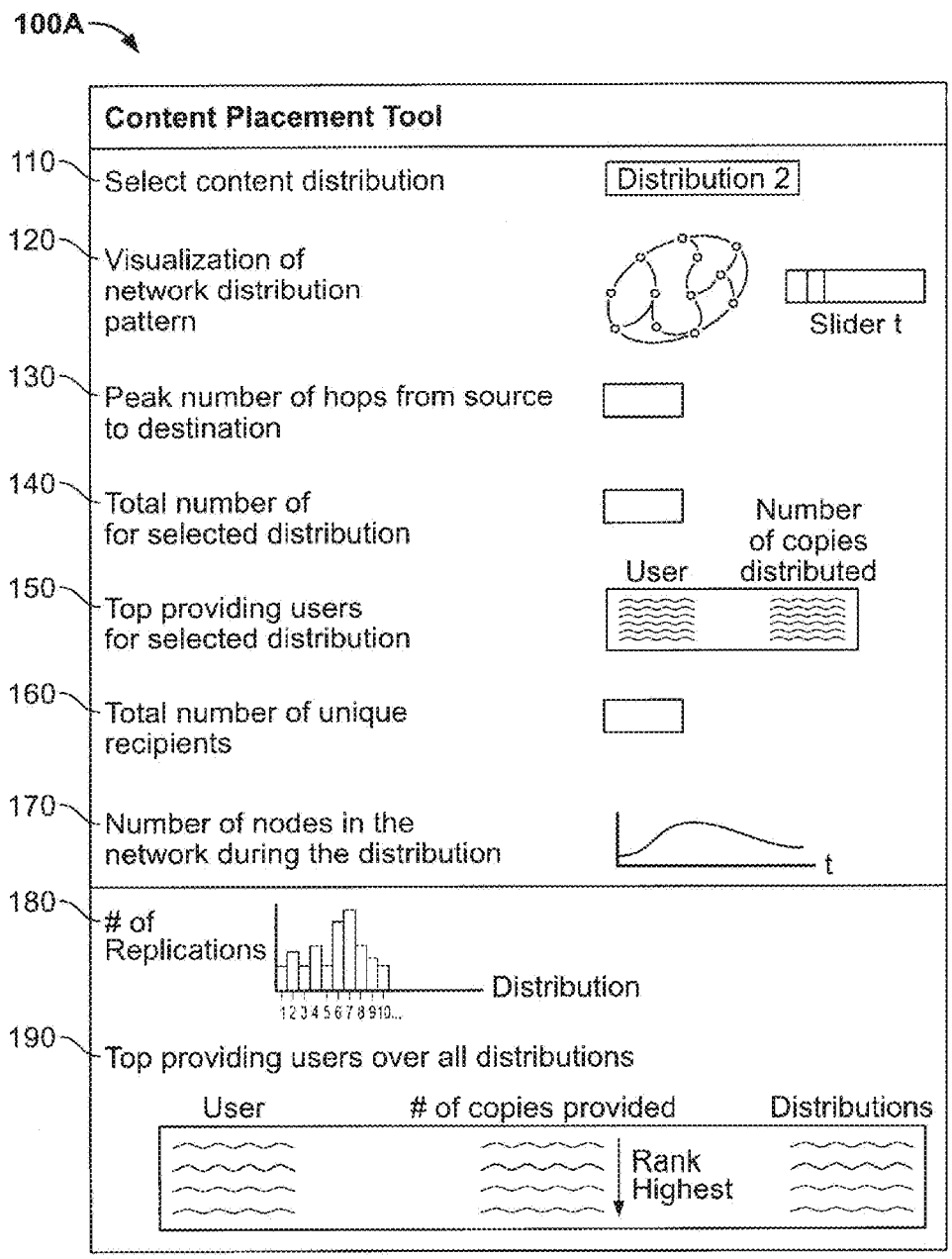
FIG. 1A shows an exemplary graphical user interface (GUI) for a tool that allows a content provider to perceive how content is distributed throughout a wireless mesh network.

Wireless mesh networks are wireless networks of wireless devices that use constituent and typically end-user wireless devices, such as those distributed to the sites of network participants or subscribers (often not administrators), as a conduit to still other devices. For example, a network of wireless laptops may use a wireless discover and routing protocol to implement a wireless mesh network. A first wireless laptop may attempt to access the Internet by exchanging communications with a content source as OSP ("Online Service Provider) through an intermediary wireless laptop. Because a wireless mesh network may be configured to provide network access in areas without connectivity and/or areas with reduced infrastructure, content providers and OSPs may distribute content or enable access to networks as services using wireless mesh networks. For example, a record label may take advantage of a wireless mesh network by distributing a new song as a promotion through the wireless mesh network.

Content providers planning injections of content into a wireless mesh network may experience efficient and desired circulation. Content providers may then collect historical network topology data and use such data to (1) determine the distribution pattern of past content distributions, and (2) predict or control future distribution patterns of content.

To provide topology information about the wireless mesh network and thus realize a desired result, an application tracks the distribution of content as content is distributed throughout a wireless mesh network. For example, a wireless network may include devices such as portable media devices and wireless laptop computers configured to exchange content. When content is exchanged, a wireless device in the wireless mesh network records information about the wireless mesh network's topology. At a subsequent time, the wireless device then may report the topology information to a reporting agent.

In one example, a content provider plans to promote a new song through a promotional release distributed throughout a wireless mesh network. In this example, the content provider desires to distribute the promotional release to 100,000 wireless devices song within three days. Using network topology information recorded during distributions, the content provider uses past models to configure the initial injection of the new song into the network. The network topology information may include, for example, the number of links used to distribute a selection, a description of the path use to distribute content between users, the number of users receiving the new song, and an indication of which users distributed the most copies of a selection to other users on the wireless network (these users are referred to as "superdistributors"). The network topology information enables a content provider to determine a distribution pattern for the content. Based on the distribution patterns, the content provider may configure a distribution program configured to accomplish objectives, for example, by most efficiently distributing a selection. For example, a content provider may model how many users would receive a selection if selected network participants who may be deemed superdistributors are targeted. The model enables the content provider to configure distribution of content in a desired manner (e.g., achieving a desired circulation) while also realizing other objectives (e.g., reduced cost).

FIG. 1A shows an exemplary GUI 100 for a content placement tool that allows a content provider to perceive how content is distributed in a wireless mesh network. GUI 100 displays information that is used in a model to predict the distribution of content distributed in a wireless mesh network and enables a user to perceive information about a particular distribution and aggregated distribution information.

Input 110 enables a user to select distribution information related to a particular content distribution from among several different content distributions for which distribution information is available. Once the user selects the particular content distribution they are interested in, GUI 100 shows the network topology information for the distribution in the results 130, 140, 150, 160, and 170.

Visualization tool 120 shows a graphical representation of the network distribution pattern of the content distribution the user selected. Visualization tool 120 includes a slider bar enabling the user to perceive how the distribution pattern changed over which time. Result 130 shows a maximum number of nodes on the wireless mesh network over which a selection passed while being exchanged between wireless devices. Result 140 shows a total number of replications of the content selection, demonstrating how widely the content selection was distributed. Result 150 indicates which users on the wireless mesh network provided the most copies to other users on the network. Result 160 indicates a total number of unique recipients of the content selection. Result 170 describes the distribution of the number of devices in the wireless mesh network during the distribution of the content selection chosen in input 110.

Results 180 and 190 illustrate network topologies data for different content distributions. Result 180 indicates a total number of replications for each different distribution, enabling the content provider to compare the depth of penetration for different distributions. Result 190 is a list of the distributing users, the replications based on the replications the user was responsible for.

Figure 1B:
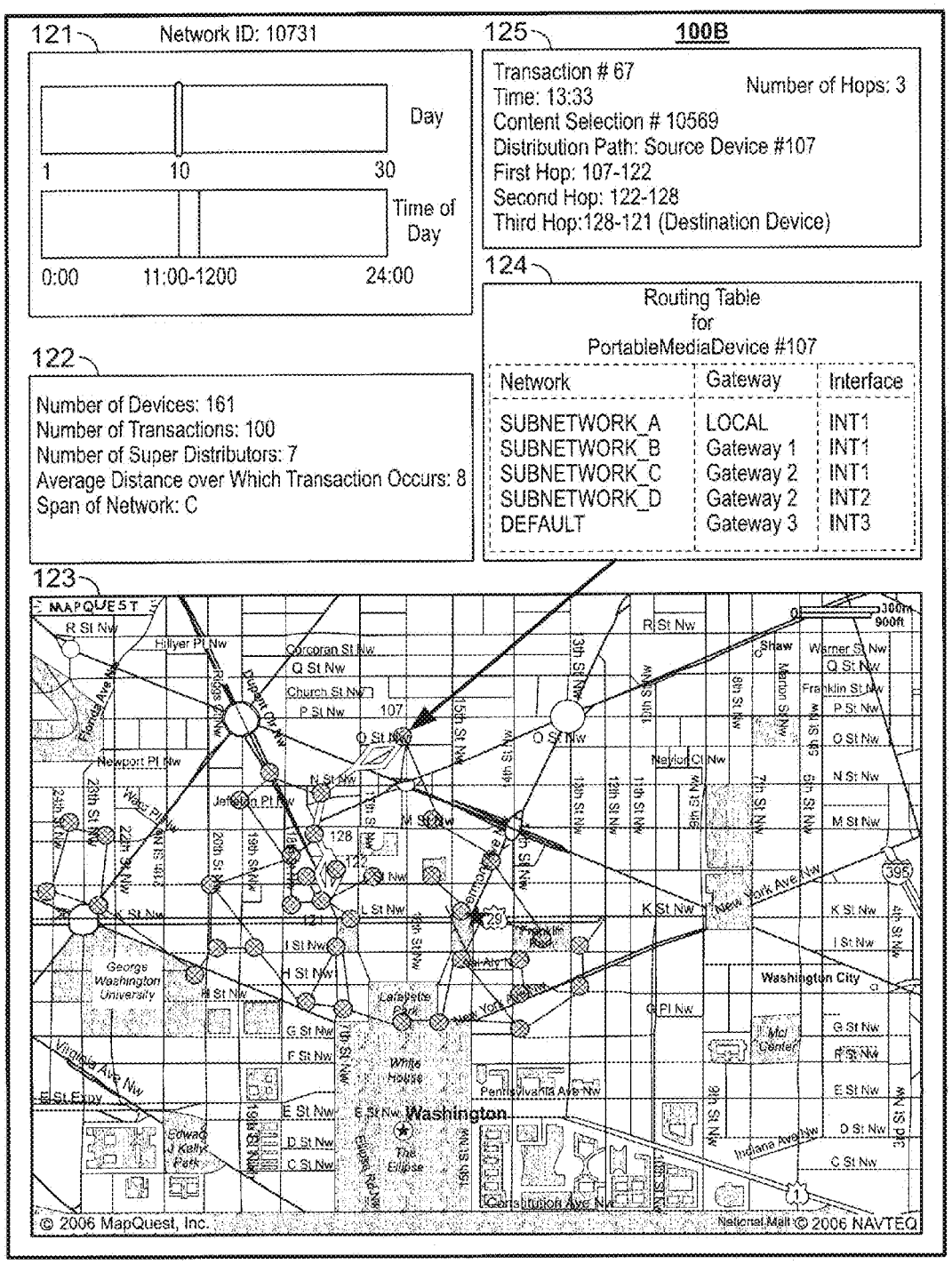
FIG. 1B shows an exemplary GUI enabling a user to perceive a network topology with respect to time.

FIG. 1B shows an exemplary GUI 100B enabling a user to perceive a network topology with respect to time. In particular, a user may interact with a time control 121 in GUI 100B to perceive a network description 122, a network map 123, and a routing table 124 for a wireless device in a wireless mesh network. FIG. 1B may be presented, for example, in response to an administrator selecting the visualization tool 120 shown in FIG. 1A.

Time control 121 enables an administrator to perceive a manner in which a network is operating with respect to time. For example, the administrator may select a day in a distribution campaign using the day selector and a time span within the selected day (e.g., 11:00-12:00) to access information descriptive of a wireless mesh network. The administrator then may adjust a slider bar control for the time span to perceive changes in the wireless mesh network over time. Enabling perception of the changes may enable the administrator to better perceive how the wireless mesh networks are being used so that the network administrator may revise a distribution campaign to achieve desired objectives.

Network description 122 indicates parameters descriptive of a wireless mesh network for a time specified by the time control 121. As shown, the network description 122 indicates that 161 wireless devices are participating in the wireless mesh network at the specified time, 100 transactions have occurred, 7 of the 161 devices are categorized as superdistributors, the average transaction involved the exchange of content across 8 links, and the span of the network is "C" hops.

The number of wireless devices may be derived by exchanging wireless routing tables, identifying the number of wireless devices in each of the wireless routing tables, and adjusting the number of wireless devices to account for duplicate entries in the wireless routing tables. The number of superdistributors may be determined by identifying superdistributors within the wireless routing tables.

In response to initiating or detecting a transaction, a wireless device (e.g., the providing or receiving system) may record the number of hops used in the path used to exchange content. The collection of transactions may be analyzed to identify the average number of hops and the median number of hops (not shown). The span of the network represents the maximum number of hops between any two devices within the wireless mesh network. For example, if two devices on remote ends of a wireless mesh network are 13 hops apart, the span of the network is 13. The span may be adjusted to require a degree of stability in the network, for example, in order to disregard unreliable metrics that occur as a wireless mesh network is being established or reconfigured. Similarly, the span may be adjusted to reflect partitioning of wireless mesh networks into smaller networks or the establishment of a gateway protocol between the smaller networks. In one implementation, the span is calculated within the smaller mesh network. In another implementation, another calculation may be performed across the constituent mesh networks with an indication that the span includes the more than one constituent network.

Network map 123 illustrates a portion of a wireless mesh network (other portions of the wireless mesh network are represented by connections that end at the left most edge of the map around 24$^{th}$ Street). Specifically, network map 120 illustrates the presence of wireless devices within the wireless mesh network, connections between the wireless mesh network, and a location of wireless devices with respect to geography (Washington, D.C.).

In one implementation, association of a wireless device with a location is based on receipt of a signal from a wireless device. For example, a wireless device with a GPS ("Global Positioning System") receiver may report location information to a host and/or record location information with respect to time. In another implementation, a location may be associated with a wireless device based on proximity to another wireless device with an established location (e.g., a fixed wireless access point or another wireless device with a GPS receiver). As a result, the location of the wireless device with the known location and an indication of proximity of the wireless device may be used to establish a location for the wireless device. In another variation where three devices are in the same wireless mesh network, proximity of a first device without a GPS receiver to a GPS-enabled second device and lack of proximity from the first device to a third device (e.g., an inability to directly exchange broadcast messages) may be used to determine that the first device is proximate to the second device but also situated in a manner remote to the third device. For example, the first device may be placed on a map connected to the first device on the opposite side of the third device.

The routing table 124 represents a routing table for a portable media device 107, which is a wireless device within the wireless mesh network shown in network map 123 (indicated by the arrow). Routing table 124 includes a list of different subnetworks, a gateway address for the subnetwork, and indication of which interface should be used on the portable media device. The routing table 124 includes a description of subnetworks, an indication of which gateway should be used to access the subnetwork, and an indication of which communications interface should be used in order to exchange content with the indicated subnetwork.

Transaction description 125 also includes a description of a transaction between portable media device #107 (device 107) and device 121. Transaction #67 occurred at 13:33 and involved the exchange of content selection #10569 (representing a song) across three hops. The first hop was between device 107 and device 122. The second hop was between device 122 and device 128. The third hop was between device 128 and device 121 (the destination device. The path used in transaction #67 is illustrated by the shaded wide line superimposed over the network topology with the diamond anchored at both ends. The representation of transaction #67 may be generated in response to the user selecting device 107 and selecting from a list of transactions in which device 107 was involved.

In one implementation, the width of the day selector time span control may be adjusted to reflect the state of the wireless mesh network over time. As a result, the network description may be adjusted to reflect different metrics over time. Similarly, the network map may be revised to reflect the aggregate topology over the adjusted time frame rather than the network topology at an instance in time. In one configuration, the aggregate topology is rendered as an animation reflecting samples from the network topology over the specified time span. In another configuration, the aggregate topology renders a generalized network capability for a geographic region and an indication of a degree of presence of wireless devices during the time span.

Figure 2:
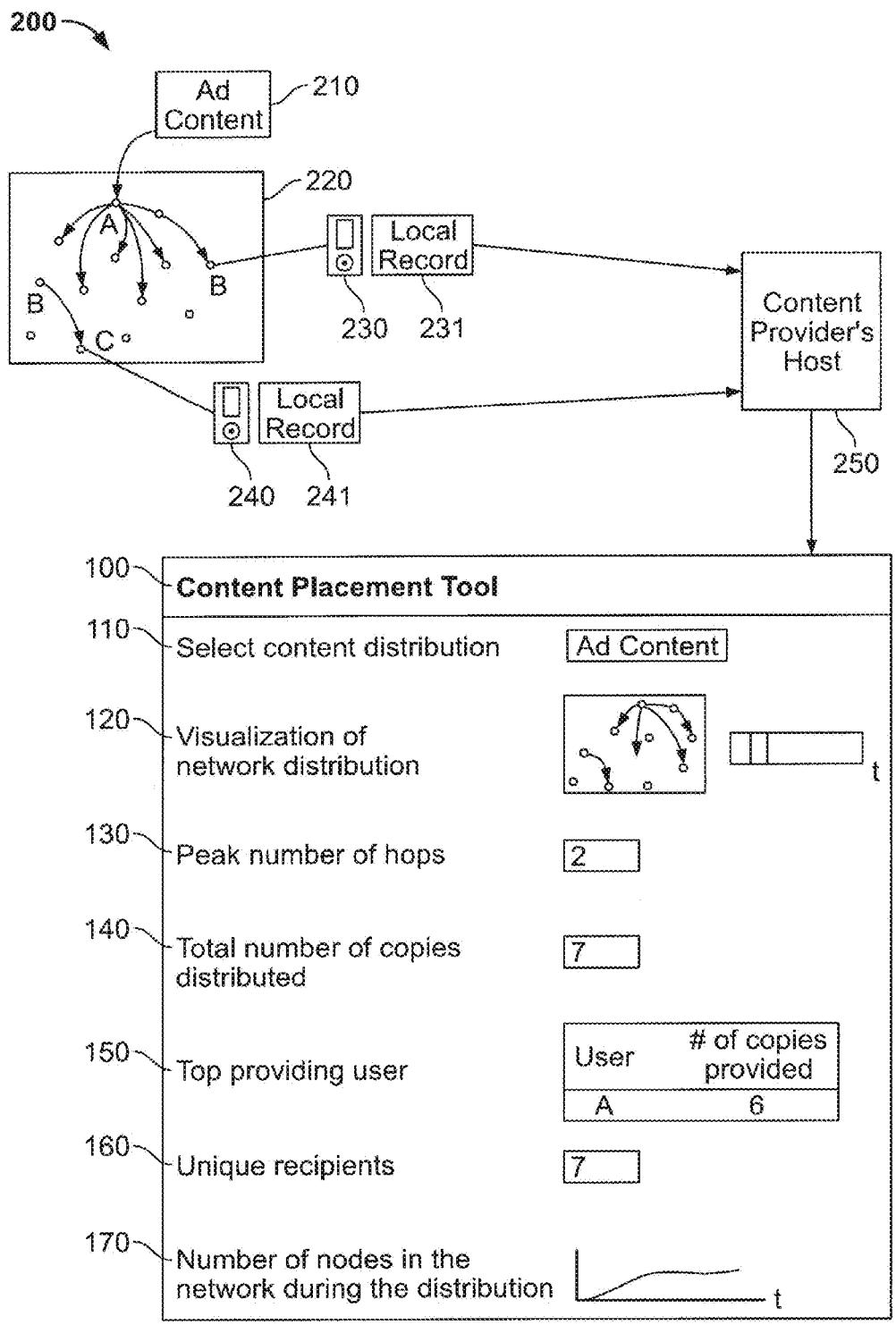
FIG. 2 illustrates how the devices in the wireless mesh network provide topology information to the content provider and shows an exemplary GUI that analyzes the wireless mesh network topology.

FIG. 2 illustrates how the devices in the wireless mesh network provide topology information to the content provider and shows an exemplary GUI 200 that analyzes the wireless mesh network topology. FIG. 2 illustrates how exemplary results from the content placement tool shown in FIGS. 1A and 1B may be used to track how advertising content 210 was distributed throughout the wireless mesh network 210. Wireless mesh network 220 includes nodes that are wireless network clients. In this example, the content provider injected advertising content 210 into the network 220 at nodes A and B. In one example, the wireless devices 230 and 240 are portable media devices. When a wireless device exchanges advertising content 210 with another wireless device on the wireless mesh network, the wireless device records the network topology information locally. Wireless devices 230 and 240 store the network topology information in local records 231 and 241, respectively. The network topology information recorded in local records 231 and 241 may include, for example, the path that the advertising content 210 was transmitted over as the advertising content 210 was exchanged from a providing user to a receiving user. Local records 231 and 241 then are reported to the host 250 operated by a content provider. Once the host 250 receives the network topology information, the host 250 may aggregate or analyze the network topology information and determine a distribution pattern.

In this example, the content provider uses the content placement tool to better understand the distribution of advertising content 210. GUI 200 displays a visualization of the distribution of advertising content 210, determines that user A is the user responsible for distributing the most instances of advertising content 210, and determines that seven copies of advertising content 210 were distributed throughout the wireless mesh network. In other examples, much larger numbers of copies may be distributed.

In this example, advertising content 210 is the only content selection that was injected into the wireless mesh network 220. However, other examples may feature multiple instances of content being distributed throughout a wireless network, concurrently or otherwise.

Figures 3, 4:
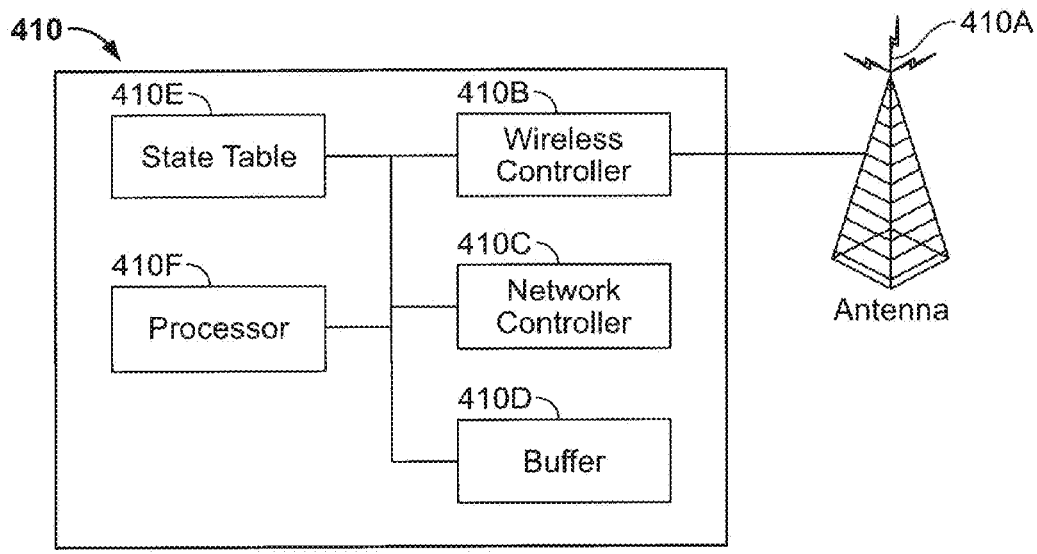
FIG. 3 illustrates an exemplary GUI enabling a content provider or network manager to perceive the distribution pattern of content injected into the wireless mesh network.
FIG. 4 is a block diagram of an exemplary wireless device.

FIG. 3 illustrates an exemplary GUI 300 enabling a content provider or network manager to perceive the distribution of content injected into the wireless mesh network. In GUI 300, a content provider is interested in distributing advertising content throughout the wireless mesh network. The content provider specifies that it will spend $50,000 on the advertising purchase in input 310. The content provider specifies that it wants 100,000 users to receive the content in input 320. Using the information from content placement tool, an advertising content tool computes the projected number of distributed copies of the advertising content at after one, two, and three days into the distribution. Additionally, if a surplus is predicted (e.g., more than 100,000 copies) will be distributed, a surplus may be indicated in the projected surplus result 331.

Proposals 330 and 340 show two examples of proposed distribution plans. The content provider may compare projected results of both plans to determine which is more desirable. In proposal 330, a content provider has modeled an initial injection to a certain number of the superdistributors, in this case by initially targeting the top 500 superdistributors. Also, proposal 330 includes an initial promotion at 100 hotspots. The hotspots might be located in, for example, coffee shops, hotels, and airports.

Proposal 340 is similar to proposal 330, except that the content provider specifies initial distribution to certain super-distributors at a certain time of the day, thereby enabling a content provider to determine if a particular time of the day is more suitable for releasing content over the wireless mesh network. For example, a wireless mesh network in a business district may be more active during the day than at night. Proposal 350 also specifies a type of wireless access point. For example, if a content provider desires to target business travelers, then airport and hotel wireless access points may be targeted rather than coffee shop hotspots.

Referring to FIG. 4, a block diagram of an exemplary wireless device 410 is shown. Generally, aspects of the wireless device 410 correspond to aspects of the wireless devices described previously with respect to FIGS. 1-3. The wireless device 410 includes an antenna 410A, a wireless controller 410B, a network controller 410C, a buffer 410D, a state table 410E, and a processor 410F. In general, the wireless device 410 uses the wireless controller 410B, the network controller 410C and/or the processor 410F to interface with a wireless mesh network, enabling it to respond to changing network conditions so that resources may be efficiently allocated.

More particularly, antenna 410A is configured and may include related circuitry to enable the wireless device 410 to transmit and receive electromagnetic signals in a specified portion of the RF (Radio Frequency) spectrum, for instance, the 2.5 Ghz spectrum used by the 802.11b protocol and/or the 5 Ghz spectrum used by the 802.11a protocol. The antenna 410A may include an omnidirectional (e.g., a uniform lobe) configuration with uniform gain in all directions, or alternatively, a non-uniform lobe, such as an array.

The related circuitry may include DSPs (Digital Signal Processors) that reduce noise and intelligently filter received signals. The related circuitry also may include one or more tuning circuits which may be modulated or multiplexed with a data signal to send or receive data.

The modulating circuits may combine an information signal with a carrier signal around which the transmitted wireless signal is based. Depending on the wireless protocol or format that is used, the information may be distributed in varying manners around the carrier signal. For example, the spectrum used by a FSK-based (Frequency Shift Keying-based) system may vary with the particular data being transmitted.

The antenna 410A may be electronically tunable, with directional gain that may be controlled by altering the phase. Additionally or alternatively, the antenna 410A may be mechanically tunable, such that the lobe orientation may be changed mechanically. For example, the antenna 410A may be coupled to a motor that changes its physical direction.

The wireless controller 410B may include a processor that enables the wireless device 410 to use the antenna 410A to communicate with other devices. In general, the wireless controller 410B manages the wireless interface and may change the wireless mode and operation in response to changing wireless and network conditions. For example, if the wireless controller 410B detects that one network 'path' (e.g., one of the antenna's available lobes) is experiencing noise and/or transmission difficulties, the wireless controller 410B may reconfigure the antenna 410A to alter the lobe so that a different path may be used to communicate.

The wireless controller 410B may use CSMA/CD ("Carrier Sense Multiple Access/Collision Detect") (e.g., Ethernet) techniques, scheduling schemes, TDMA ("Time Division Multiple Access") techniques, CDMA ("Code Division Multiple Access") techniques and/or token passing schemes to allocate bandwidth. Generally, a CSMA/CD system operates so that one device may transmit when no other devices are transmitting. In scheduling schemes, the nodes negotiate for a designated channel in the spectrum. In CDMA, a code-modulating scheme is used to specify which frequencies are presently unavailable (e.g., currently used for transmission), while in a token passing scheme, the nodes negotiate for the token. When a node has the token, the node then may transmit.

The network controller 410C is structured and arranged to control the interface to the wireless mesh network. Typically, controlling the interface involves monitoring the state of a connection, link, path, and/or network so that the wireless device 410 may dynamically respond to network conditions and events. Controlling the network interface also generally involves responding to or acting upon monitored conditions in an attempt to improve the performance of one or more wireless devices 410. For example, the wireless device 410 may be involved in downloading a large file. Depending on the nature of the file, the network controller 410C may control the download to compensate for the network conditions and take advantage of download requirements to optimize the performance for the wireless network. More particularly, if the download is a VOD (Video-on-demand) file, the network controller 410C may interface with the wireless base station and other wireless devices so that the wireless device 410 receives guaranteed performance and/or increased bandwidth. In another example, if the downloaded file is non-critical or not time-sensitive, the network controller may interface with the wireless base station and/or other wireless devices so that other transmissions may receive priority relative to the non-critical download.

Although the wireless controller 410B and the network controller 410C are described separately, implementations may include situations where either or both controllers provide information to enable coordinated communications. For example, the wireless controller 410B may exchange state information relating to RF transmission patterns, noise, interference, signal strength, and the presence of other devices with the network controller 410C to determine how to route the data. Similarly, the network controller 410C may provide transmission requirements to the wireless controller 410B to interface with the wireless base station 140 to allocate more bandwidth.

The buffer 410D may include memory that stores data for transmission or receipt. For example, if the wireless device 410 is acting as a relay for other wireless devices, its buffer 410D may store buffer information received from one wireless device received on one channel, and then may transmit the stored information on a second channel to the wireless base station to effect redirection of that information as a relay.

The state table 410E may be associated with a central management configuration, a distributed configuration, or a hybrid configuration. A central management configuration describes a wireless network configuration where updates and information may be aggregated to management agent. The management agent then may task, distribute, or reconfigure other systems accordingly. In a distributed configuration, each participating wireless device is configured to determine a configuration for itself and act accordingly. For example, a wireless device may be configured to exchange information with other wireless devices. The wireless device then may use the exchanged information to structure communications.

A distributed configuration describes a state table 410E that may provide some hierarchical collection that also enables the system to decide a range of activities for itself. In one example of a hybrid configuration, the state table 410E may be built on a central management system. The central management system then may be "pushed" to the wireless devices (or a base station) so that the wireless device may make local decisions based on localized events. In one example, the central management system may provide a "master configuration" and enable the wireless device to operate within an identified range. For example, the wireless device may be allowed to transmit a maximum of 1 Mbps unless the wireless device is acting as a relay, in which case the wireless device may transmit at 4 Mbps.

The state table 410E may include memory with network topology information that tracks the state of other devices participating in the wireless network 100. In one implementation, the wireless device 410 periodically polls other devices in the wireless network 100 for availability. For example, the wireless device may periodically ping ("packet Internet gopher") other devices in the same network. The response times may be used to gauge the quality of the wireless network 100 and/or channel as well as the state of the connection between two nodes in the wireless network 100. For example, in a set of four (4) pings from a first node to a second node, two (2) of the requests may be dropped while the other two (2) requests may receive a response in four (4) ms, indicating that the first and second nodes might be close geographically (hence the four (4) ms response), but that congestion is preventing the other nodes from responding (hence, the dropped response).

The state table 410E may be updated using other operations. For example, the wireless devices may send periodic updates to a management station. These updates then may be correlated to describe the state of the wireless network. For example, if the updates include a traffic utilization metric, the updates may be used to identify which portion of the wireless network is experiencing congestion. This congestion may be localized to a particular wireless device, condition, event, or lobe pool. The state table 410E then may be used to prepare the response to the source of the congestion or interruption.

The state table 410E may be associated with a central management configuration, a distributed configuration, or a hybrid configuration. A central management configuration describes a wireless network configuration where updates and information may be collected by a management agent. The management agent then may task, distribute, or reconfigure other systems accordingly. In a distributed configuration, each participating wireless device is configured to determine a configuration for itself and act accordingly. For example, a wireless device may be configured to exchange information with other wireless devices. The wireless device then may use the exchanged information to structure communications.

A distributed configuration describes a state table 410E that may provide some hierarchical collection and also enables the wireless devices to decide a range of activities for themselves. In one example of a hybrid configuration, the state table 410E may be built on a central management system. The configuration then may be "pushed" to the wireless devices (or a base station) so that the wireless device may make local decisions based on localized events. In one example, the central management system may provide a "master configuration" and enable the wireless device to operate within an identified range. For example, the wireless device may be allowed to transmit a maximum of 1 Mbps unless the wireless device is acting as a relay, in which case the wireless device may transmit at 4 Mbps.

In addition to maintaining network topology information that monitors network performance, the state table 410E also may be used to maintain a topology of the wireless network 100, or a sub portion thereof. For example, a collection of wireless devices 410 and a base station (not shown) may be running a routing protocol with updates to determine how a wireless device 410 should communicate with one or more exterior gateways (e.g., an Internet access point). This routing protocol may include both networking and wireless access considerations. For example, if two paths form an equal cost, but one of the nodes is a wireless device 410, while the other system is a base station, the wireless base station may be 'preferred', all other things equal.

The processor 410F may be structured and arranged to integrate one or more functions across the wireless device 410. Additionally, the processor 410F typically may enable one or more other applications. Although the processor 410F is shown as being distinct from the network controller 410C, aspects of the processor 410F and the network controller 410B may be shared. For example, aspects of the network controller 410C may be implemented in specialized hardware (e.g., ASICs (Application Specific Integrated Circuit)) to perform frame and packet processing, while a general-purpose processor 410F provides access to user applications (e.g., email) and also calculating routing updates.

The wireless device 410 may include a media component (not shown) configured to render rich media content (e.g., audio or video files). For example, the wireless device 410 may include a compact liquid crystal display that lets a user perceive video content. Similarly, the wireless device may include a speaker or an audio connector configured to generate an audio signal of a compressed file or of the audio component of a video programming.

Figure 5:
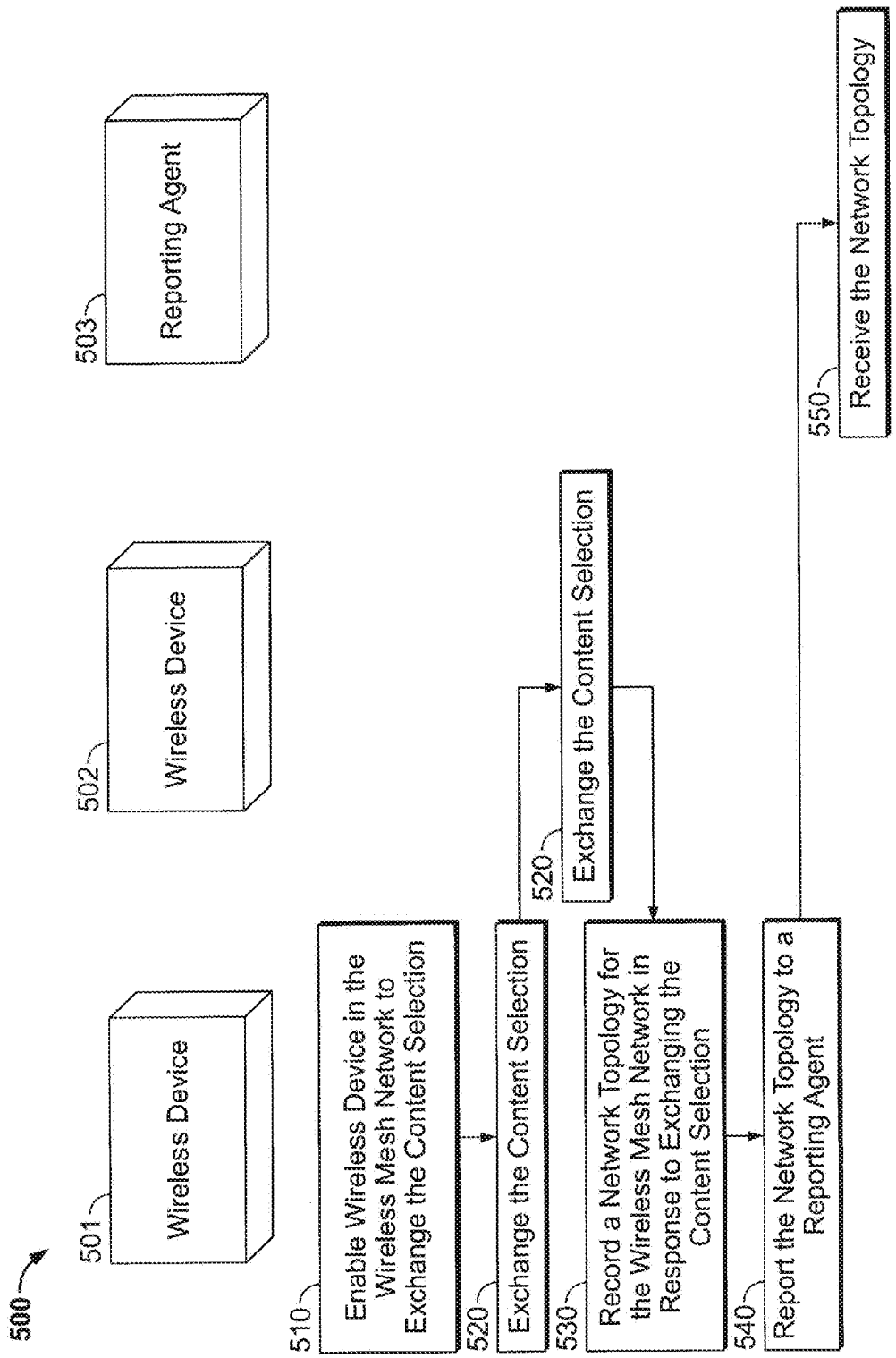
FIG. 5 is a flow chart of an exemplary process by which content is tracked through a wireless mesh network.

FIG. 5 is a flow chart 500 of an exemplary process by which distribution of content throughout a wireless mesh network. Generally, the operations in flow chart 500 may be used by the systems and operations described previously in FIGS. 1-4. For example, a wireless device 410 described with respect to FIG. 4 may perform the operations shown in FIG. 5 in order to render the GUIs shown in FIGS. 1-3.

Initially, the wireless devices are enabled to exchange a content selection (510). For example, a content provider may transmit a content selection with a popular new song to a user with the hope that the user loads the popular new song to a wireless-enabled portable media device and shares the popular new song with other users. As such, the content provider may transmit the content selection with a set of distribution rights. For example, a content provider may enable unlimited distribution over the next month or curtail distribution after a threshold number of distributions.

The wireless devices 501 and 502 then exchange the content selection (520). The wireless devices 501 and 502 may exchange content in multiple ways. For example, a wireless device 502 may be configured to advertise which, if any, content selections are available. As a result, a user on the wireless device 501 may request the advertised content selection from the wireless device 502. In another implementation, a user may transmit a request for a particular song or type of content as a broadcast message into a wireless mesh network. For example, a user with an interest in songs by the artist "Van Halen" may interact with their own wireless device to search a wireless mesh network for other devices offering songs by the artist "Van Halen." As a result, the user's wireless device may transmit a broadcast message with parameters expressing the user's interest.

In still another example, a user on wireless device 502 streams the content to wireless device 501 so that the recipient wireless device only stores a portion of the content selection. For example, a content provider may limit the actual number of content selections being distributed. Instead, the content provider may prefer to register "stream impressions" hosted by superdistributors and provide instructions governing how the content selection may be distributed (e.g., use a stream mode after particular date, after a particular number of distributions, or in the absence of a reauthorization instruction from the content provider after a particular date).

When the content is exchanged, the network topology for the wireless mesh network is recorded (530). The network topology may represent a number of factors. For example, the network topology may include recording path information related to a distribution path used to exchange the content selection between a providing device and a receiving device (e.g., links between nodes A, B, and C were used to exchange the content selection), recording bandwidth utilization across one or more links in the wireless network as the content selection is exchanged (e.g., the most congested link was operating at 50% utilization), recording a description of which applications are being used across one or more links in the wireless network as the content selection is exchanged (e.g., web browsing, instant messaging, and Internet Radio), and/or recording identification information for other devices in the wireless mesh network as the content selection is exchanged (e.g., device ID #123). Recording the identification information for the other devices may include recording a description of at least one user on the wireless devices (e.g., with a screen name). In yet another implementation, recording network topology may include updating a routing table such as that described earlier with FIGS. 1A and 1B.

The network topology information that is recorded is reported to a reporting agent 503 (540). In one example, the reporting agent 504 resides on or is accessed through a user's personal computer. In this example, if the wireless device is directly connected to the personal computer at a subsequent time, the personal computer may, in turn, provide the network topology information to a host supported by a content provider. Alternatively, if the wireless device is not directly connected to a host, the network topology information may be transmitted to other wireless devices that will provide the network topology information to the host when the other wireless devices connect to a personal computer.

Figure 6:
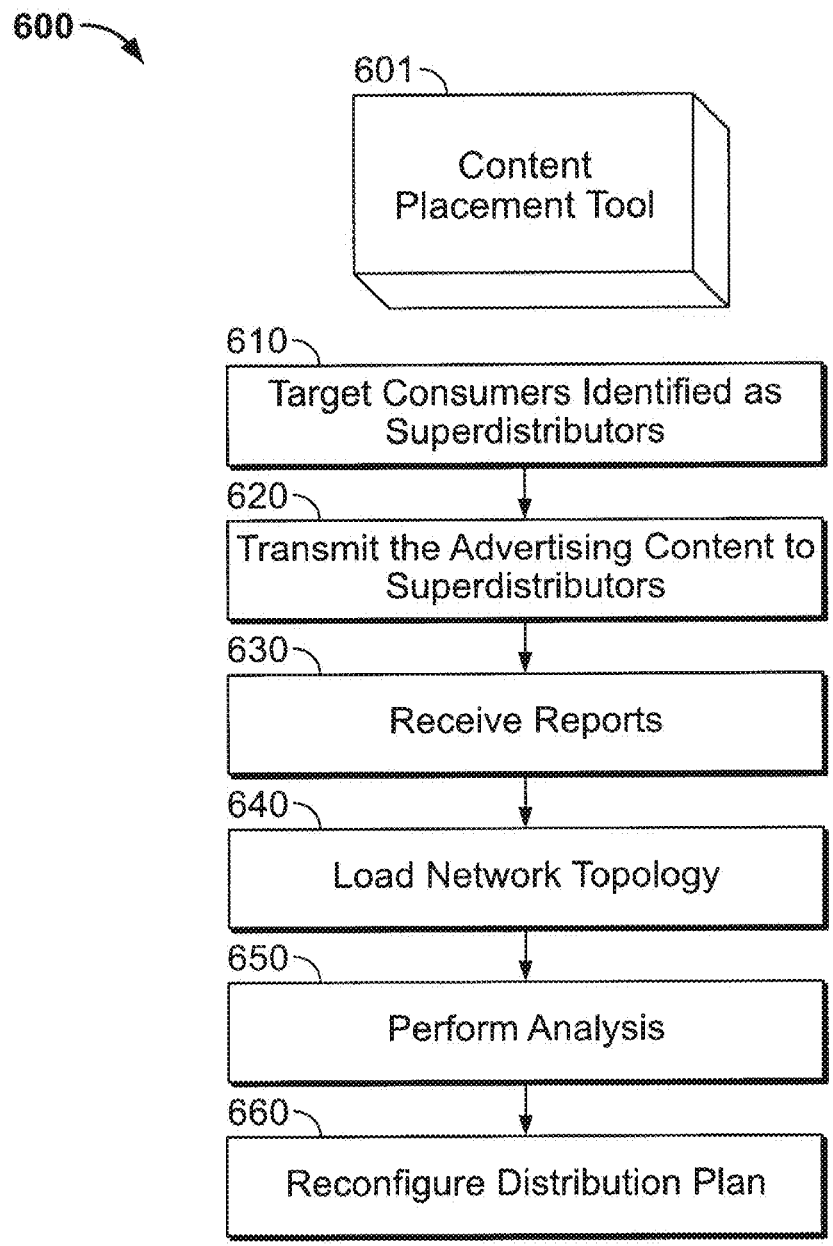
FIG. 6 is a flow chart of an exemplary process by which advertising content is tracked through a wireless mesh network.

FIG. 6 is a flow chart 600 for an exemplary process by which advertising content is distributed throughout a wireless mesh network. While aspects of flow chart 600 may relate to the operations described with respect FIG. 5, flow chart 600 illustrates how a distribution plan for advertising content may be configured using a content planning tool that using prior network topology information. A content provider faces a number of challenges in placing advertising content. For example, while many users eagerly exchange promotional releases with a popular new song, the same users may avoid exchanging advertising content. As result, a content placement tool may provide tremendous value in anticipating challenges in a distribution plan and reconfiguring a distribution plan to realize objectives.

In this example, the advertising content being distributed is designed to promote a new movie (e.g., a movie trailer). While some users enjoy movie trailers, some users may not, and a content provider faces challenges in exposing the users that typically do not enjoy the advertisements in general to the particular advertising content.

In configuring a distribution plan, a content provider with a 100,000 impression (e.g., views) placement objective may initially target consumers identified as superdistributors using a content placement tool 601 (610). For example, a superdistributor may be highly effective at promoting advertising content and cost less than a commercial wireless device (e.g., a wireless access point at an airport). Desiring to minimize costs, the content provider transmits the advertising content to 200 superdistributors (620). Each superdistributor is given an online music store credit in exchange for agreeing to promote advertising content.

The content provider receives a report that 180 of the superdistributors have accepted the offer. In the following three days, the superdistributors promote the advertising content and subsequently provide reports with network topology, e.g., periodically after a daily synchronization (630). The reports indicate that the participating superdistributors are responsible for 1,000 impressions the first day, 2,000 impressions the second day, and 500 impressions a third day.

Not satisfied with the results and a placement objective with 96,500 impressions remaining, the content provider performs analysis and loads the network topology to the content placement tool 601 (640). After reviewing the reports and using past distribution patterns, the content placement tool reveals that the 180 participating superdistributors have performed most of their distribution during their morning and afternoon commutes. However, past distribution patterns for movies with similar demographics indicate that the desired demographic was most active in exchanging content over lunch (650). As a result, the content provider may reconfigure the distribution plan to inject additional content at wireless access points situated at or near lunchtime venues (660). For example, the content provider may pay a premium to a commercial provider of wireless Internet Access points so that the commercial provider distributes a specified number of instances of advertising content. By directly placing more instances among the desired demographic likely to frequent the lunchtime venues, the content provider may achieve better results as the effects of propagation are compounded by the wireless mesh network.

What is claimed is:

1. A method of adjusting a wireless network, the method comprising the following operations performed by at least one processor associated with a manager of the wireless network:
   detecting a transaction on the wireless network involving at least one wireless device;
   recording transaction data including a total number of network hops involved in the transaction;
   analyzing the recorded transaction data to determine a maximum span of the wireless network and a distribution pattern of the transaction;
   creating a distribution plan for the wireless network based on the determined maximum span and distribution pattern of the transaction; and
   adjusting the wireless network based on the distribution plan to thereby optimize transactions on the wireless network.

2. The method of claim 1, wherein the determined maximum span represents the maximum number of hops between any two wireless devices in the wireless network.

3. The method of claim 2, wherein adjusting the wireless network comprises partitioning the wireless network into smaller networks to reduce the maximum span of the network.

4. The method of claim 1, wherein the transaction data is recorded locally to the at least one wireless device.

5. The method of claim 4, further comprising reporting the locally recorded transaction data to a remote content provider.

6. The method of claim 1, wherein the transaction data includes a description of the transaction between the at least one wireless device and another wireless device.

7. The method of claim 1, wherein the transaction data includes a recording of bandwidth utilization across one or more links in the wireless network.

8. The method of claim 1, further comprising:
depicting the transaction on a user interface, the user interface including a map of the wireless network displaying details of the transaction based on the recorded transaction data.

9. The method of claim 8, wherein a user can select at least one wireless device on the user interface to display a list of transactions in which the at least one wireless device was involved.

10. A tangibly embodied non-transitory computer-readable storage medium storing instructions that, when executed by at least one processor associated with a manager of the wireless network, cause the at least one processor to perform a method for adjusting a wireless network, the method comprising:
receiving recorded transaction data including a total number of network hops involved in the transaction;
analyzing the recorded transaction data to determine a maximum span of the wireless network and a distribution pattern of the transaction;
creating a distribution plan for the wireless network based on the determined maximum span and distribution pattern of the transaction; and
adjusting the wireless network based on the distribution plan to thereby optimize transactions on the wireless network.

11. The computer-readable storage medium of claim 10, wherein the determined maximum span represents the maximum number of hops between any two wireless devices in the wireless network.

12. The computer-readable storage medium of claim 11, wherein the instructions executed by the at least one processor further cause the at least one processor to adjust the wireless network by partitioning the wireless network into smaller networks to reduce the maximum span of the network.

13. The computer-readable storage medium of claim 10, wherein the transaction data is recorded locally to at least one wireless device.

14. The computer-readable storage medium of claim 13, wherein the instructions executed by the at least one processor further cause the at least one processor to receive the locally recorded transaction data from the at least one wireless device.

15. The computer-readable storage medium of claim 10, wherein the transaction data includes a description of the transaction between a first wireless device and a second wireless device.

16. The computer-readable storage medium of claim 10, wherein the transaction data includes a recording of bandwidth utilization across one or more links in the wireless network.

17. The computer-readable storage medium of claim 10, wherein the instructions executed by the at least one processor further cause the at least one processor to:
depict the transaction on a user interface, the user interface including a map of the wireless network displaying details of the transaction based on the recorded transaction data.

18. The computer-readable storage medium of claim 17, wherein a user can select at least one wireless device on the user interface to display a list of transactions in which the at least one wireless device was involved.

19. An apparatus associated with a manager of a wireless network, the apparatus comprising:
a storage medium storing instructions; and
at least one processor executing the stored instructions to:
receive recorded transaction data including a total number of network hops involved in a transaction on the wireless network involving at least one wireless device;
analyze the recorded transaction data to determine a maximum span of the wireless network and a distribution pattern of the transaction;
create a distribution plan for the wireless network based on the determined maximum span and distribution pattern of the transaction; and
adjust the wireless network based on the distribution plan to thereby optimize transactions on the wireless network.

20. The apparatus of claim 19, wherein the maximum span of the network represents the maximum number of hops between any two wireless devices in the wireless network.

21. The apparatus of claim 20, wherein the at least one processor further executes the stored instructions to adjust the wireless network by partitioning the wireless network into smaller networks to reduce the maximum span of the network.

22. The apparatus of claim 19, wherein the transaction data is recorded locally to at least one wireless device.

* * * * *